Patented Feb. 14, 1950

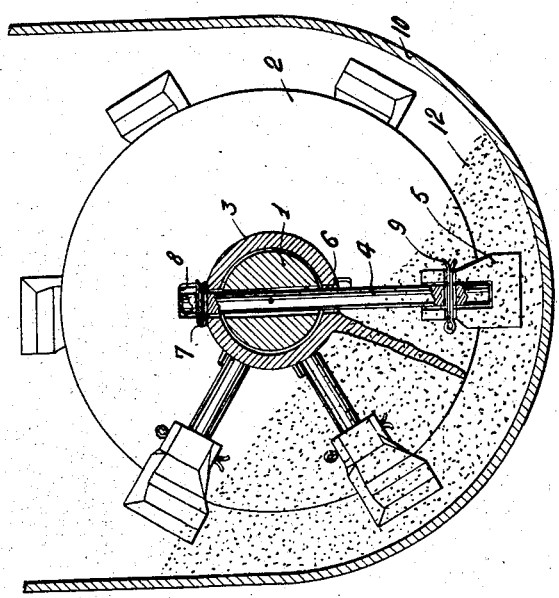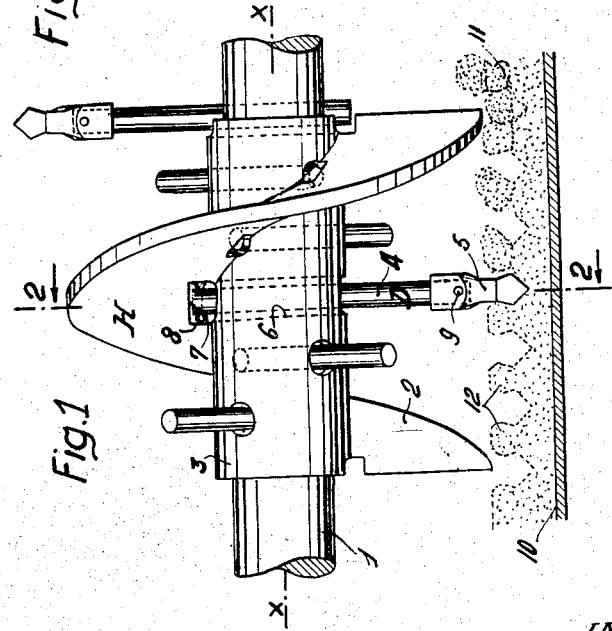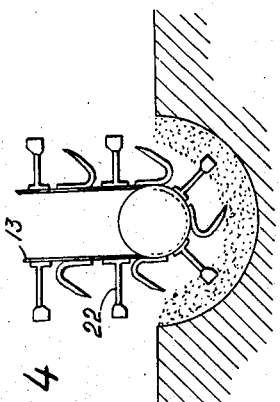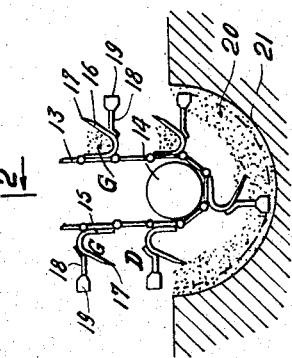

2,497,295

UNITED STATES PATENT OFFICE 2,497,295

DEVICE FOR MANIPULATING SAND AND OTHER PULVERULENT SUBSTANCES

Jean Albert Cavallier, Nancy, France, assignor to Société: Pompes Noel, Liverdun (Meurthe-et-Moselle), France, a French company Application July 24, 1947, Serial No. 763,192
In France August 1, 1946

2 Claims. (Cl. 259—109)

It is known that endless screws, bucket elevators and other devices for dealing with sand, flour and other pulverulent substances comprise a fixed hollow part forming a passageway in which the material to be dealt with is carried along by propulsive movable members such as endless screws or buckets. In the known devices the periphery of the movable members, on account of the clearance necessary, is kept at a certain distance from the fixed wall. The result is that the material comprised in the interior of this clearance escapes being carried along and is furthermore compressed by the propelling members, thus forming a veritable stationary coating or lining against which the movable members referred to rub. This consequently causes rubbing or friction, whence:

On the one hand, there is a considerable increase in the power necessary, whatever may be the substance dealt with.

On the other hand, considerable wear takes place of the movable members particularly in the case of hard substances such as foundry sand for example.

It should be furthermore pointed out that the coating or lining thus formed is not renewed and is capable of deterioration.

It has already been proposed to fix, on the active edge of the movable propelling members, projections intended to penetrate into the coating formed in order to split this up, but experience has shown that these means do not give satisfactory results and that they cause a considerable increase of the power required.

The present invention has for its object a device for handling sand or other pulverulent substances, improved with a view to avoid the formation of the coating referred to above and to considerably increase the mixing up of the said sand or the said substance. This device is characterised in particular by its movable part comprising breaking up fingers or members arranged between the propelling elements, screws, buckets or the like, in such manner as to prevent the formation of a fixed coating of material not carried along.

Experience has, in fact, shown that with this device the coating which the propelling members tend to form, is destroyed as soon as it commences to form. All the drawbacks resulting from this coating: the necessary driving force and the wear are considerably reduced and suppressed.

Other characteristics and advantages will appear from the description which follows.

On the annexed drawing given simply by way of example:

Fig. 1 is a partial longitudinal section of a screw device, improved according to the invention;

Fig. 2 is a cross section on the line 2—2 of Fig. 1;

Fig. 3 is a diagrammatic vertical section of an improved bucket elevator according to the invention.

Fig. 4 is a partial section of a modification.

According to the embodiment represented on Figs. 1 and 2 the handling device is intended for the mixing and conveyance for example of foundry sand. This device comprises a helicoid H, fixed on a shaft I driven in rotation by a motor and rotating about an axis XX.

The helicoid H is composed of elements having a length equal to the pitch of the said helicoid, fitted on to the shaft I, one after the other. These screw elements each forming a thread or pitch, are constituted by a solid spiral 2 integral with a tubular sleeve 3.

The said elements are secured to the shaft by fingers or pawls D which play the part of keys or pins. Each finger D is constituted by a rod 4 and a breaker shoe 5. The rod is passed through a hole 6 in the sleeve 3 and the shaft I, each rod 4 is immobilised by a pin 7 and is fitted into a recess 8 made in the spiral 2.

The breaker shoe 5, in cast iron or in steel, has an enlarged base. It is detachable and is fixed to the rod 4 by a pin or gudgeon 9.

The whole, (including the holes 6 for the fingers) is utilised as cast in the foundry.

It will be seen from the device described that the breaking up extremities of the fingers D are located on a helix having the same pitch as the helicoid H but a larger diameter and are displaced by half a thread with respect to this helicoid.

The number of fingers between two spirals may be variable, it is equal to six in the embodiment described.

The screw moves in rotation in a trough 10 in which the sand to be conveyed is placed. A coating of hard sand 11 would tend to be formed if the fingers D were not used, these ensuring the formation of clods or balls 12 and the breaking up of the sand, so destroying the said coating.

The fingers D having their breaking up extremities 5 located between two spirals, the said fingers and the spirals pass successively at the same point in the sand. This avoids the tight packing due to the simultaneous passage of the unit formed by finger and spiral at the same point of the coating (the sand being then compressed and not being able to escape anywhere), as is usual in known systems. On the contrary, the arrangement according to the invention ensures a rapid mixture of the sand of one compartment determined by a thread or pitch of the coating, with that of an adjacent compartment.

The breaking up shoe 5, owing to its enlarged base, causes lumps or clods of sand to be formed which are constricted at their base and are thus easy to detach and to carry along.

The lateral shifting or staggering of the fingers permits the tracing of parallel grooves in the coating of sand, which ensures a regular ploughing up of the said coating and an energetic mixing of the sand which constitutes it.

The longitudinal shifting or staggering of the fingers permits the tracing or successive grooves, this causing a free opening out of the cones or sheaves of sand, thus avoiding the packing together thereof.

Furthermore, owing to the very simple method of fixing the breaking up shoes, these are very easily interchangeable.

The whole of the device described is particularly advantageous as regards its cost price and its maintenance, actually:

The shaft 1 is of commercial round iron,

The helicoid H is easy to cast and is used as it comes from the foundry,

The fingers D are easy to replace, they are also rough and of cheap cost of manufacture; their detachable extremities 5 make their use still more economical for they can be changed separately after becoming worn.

According to the embodiment shown by Fig. 3, the device is constituted by a bucket elevator comprising a chain 13 carrying regularly spaced buckets G. The said chain passes round a lower drum 14 and about a similar upper drum not shown.

The buckets G have one of their walls, 15, riveted or welded to the chain, the other wall 16 is directed outwardly, its extremity 17 forming an attacking edge to scrape the sand and cause it to penetrate into the bucket.

Fingers constituted by rods 18 and breaking up shoes 19 are fixed under the buckets G, their breaking up shoes 19 being located in the rear of the active edge 17 of the said buckets, the rod 18 being fixed by riveting or welding on to the buckets. The shoes 19 are of the same shape and the same method of fixing as in the first example of embodiment.

Each bucket carries a single finger and the fingers fixed to the successive buckets are staggered laterally one with respect to the other and they trace parallel grooves, regularly spaced, in the sand 20 of the trough 21, thus destroying the coating thereof which might have been able to form. The grooves are traced successively since there is one only for each bucket.

All the advantages above described will be found in this method of embodiment.

The modification of Fig. 4 only differs from the foregoing by the rods 22 of the fingers being fixed directly on the chain (or belt) 13.

Naturally, the invention is not restricted to the methods of embodiment shown and described which have only been given by way of example.

Thus, the breaking up fingers may be used in combination not only with a helicoid or a bucket but also with any other device comprising propelling members kept at a certain distance from a fixed wall, for example chains with scrapers.

The helicoids may be constituted by independent elements having any length or by a monobloc piece, the different parts of this helicoid being cast as described, or forged or obtained in any other way in one or more parts assembled together.

The breaking up shoes may be carried by independent fingers or be integral with the propelling member. The rods may be riveted, welded or attached in any other manner. The shoes may be fixed or detachable.

In the case of a chain (or belt), with buckets, there may be one or more fingers attached to each of the buckets, or the fingers may be arranged between the buckets, or, on the contrary, the fingers may be less numerous than the buckets, so that there are several buckets between each finger.

Where there are several fingers to a bucket or between two buckets, they are spaced laterally and longitudinally or inclined differently with respect to the attacking edge of the bucket, so as to trace parallel and consecutive grooves.

Having now described my invention what I claim as new and desire to secure by Letters Patent is:

1. A device for handling pulverulent material comprising a fixed wall for supporting said material which is to be displaced with respect to said wall, a support which is movable with respect to said wall, a hub on said support, a helicoid propelling element fixed to said hub for moving said material along said wall, said helicoid having spaced notches formed in its wall adjacent the hub, rods carrying breaking-up fingers extending through said hub and support to key said hub to said support, said rods projecting into said notches, securing pins in said rods within said notches to prevent displacement of said rods, said rods being disposed radially about said hub opposite said helicoid in the path of the pitch of said helicoid where it joins said hub, said breaking-up fingers extending radially towards said wall and projecting beyond the outer extremity of said helicoid so as to break up progressively with its formation, the layer of material formed on said wall and not reached by said helicoid.

2. A device for the conveyance of pulverulent material comprising a trough for receiving said material at one end and delivering it at the other end, a shaft in said trough, a rotatable worm thereon extending longitudinally of said trough, the radius of the worm being shorter than the distance from its axis to the trough, radial arms extending through the worm shaft between the convolutions thereof, and so positioned on said shaft that their axes are on an helicoid surface having the same pitch as the worm but staggered axially with respect to that worm, the length of each arm from the surface of the shaft being substantially equal to the radius of the worm, a spear shaped digging head removably connected to the end of each arm, the composite radial arm having a radius longer than that of the worm, but shorter than the distance from the worm axis to the trough, said spear shaped heads being adapted to cut parallel, equidistant furrows in the form of partially closed slots in the layer of material in the trough and project said material into the path of said worm for conveyance.

JEAN ALBERT CAVALLIER.

(References on following page)

REFERENCES CITED

The following references are of record in the file of this patent:

UNITED STATES PATENTS

| Number | Name | Date |
|---|---|---|
| 277,319 | Miller | May 8, 1883 |
| 548,521 | Cummins | Oct. 8, 1895 |
| 900,787 | Schreck, Sr. | Oct. 13, 1908 |
| 992,629 | Akins | May 16, 1911 |
| 1,222,584 | Barr | Apr. 10, 1917 |
| 1,858,796 | Wilcoxson | May 17, 1932 |
| 2,014,636 | Rosendahl | Sept. 17, 1935 |